United States Patent [19]
Zlatkus

[11] Patent Number: 6,074,966
[45] Date of Patent: *Jun. 13, 2000

[54] NONWOVEN FABRIC COMPOSITE HAVING MULTI-DIRECTIONAL STRETCH PROPERTIES UTILIZING A CELLULAR OR FOAM LAYER

[76] Inventor: Frank P. Zlatkus, 1122 Cardinal Dr., West Chester, Pa. 19382

[*] Notice: This patent issued on a continued prosecution application filed under 37 CFR 1.53(d), and is subject to the twenty year patent term provisions of 35 U.S.C. 154(a)(2).

[21] Appl. No.: 08/929,229

[22] Filed: Sep. 9, 1997

Related U.S. Application Data

[60] Provisional application No. 60/024,741, Aug. 28, 1996.

[51] Int. Cl.[7] ............................................. B23B 27/00
[52] U.S. Cl. ..................... 442/413; 442/370; 442/385; 442/408
[58] Field of Search .................................. 442/370, 385, 442/400, 413

[56] References Cited

U.S. PATENT DOCUMENTS

| | | |
|---|---|---|
| 4,950,531 | 8/1990 | Radwanski et al. .................... 428/284 |
| 5,334,446 | 8/1994 | Quantrille et al. . |
| 5,413,849 | 5/1995 | Austin et al. . |
| 5,514,470 | 5/1996 | Haffner et al. . |
| 5,518,801 | 5/1996 | Chappell et al. . |
| 5,531,729 | 7/1996 | Coles et al. . |
| 5,540,976 | 7/1996 | Shawver et al. . |

*Primary Examiner*—Helen L. Pezzuto
*Attorney, Agent, or Firm*—Robert B. Famiglio; Famiglio & Associates

[57] ABSTRACT

A non-woven fabric laminate having stretch properties constructed using hydroentanglement methods is disclosed. The laminate is comprised of at least two layers and utilizes a foam layer as a component in the preferred embodiment, replacing conventional use of fibrous materials. A superior elastomeric fabric utilizing an open or closed cell foam layer as one element of the composite structure and as the elastic member of the fabric results in superior fabric characteristics when compared to similar hydroentangled fabrics which are constructed from fibrous materials.

13 Claims, 3 Drawing Sheets

Fig-1

NONWOVEN FABRIC COMPOSITE HAVING MULTI-DIRECTIONAL STRETCH PROPERTIES UTILIZING A CELLULAR OR FOAM LAYER

REFERENCE TO PRIOR APPLICATION

This application claims the benefit of the filing date of the applicant's Provisional Patent Application #60/024,741 filed Aug. 28, 1996.

BACKGROUND OF THE INVENTION

The field of nonwoven fabric laminates has been well developed to devise fabrics with both machine and cross directional stretch properties utilizing conventional lamination which consists of heat and/or adhesives to produce the final product. The present state of the art includes use of multi-layer fabrics of fibrous composition to provide for the entanglement process. Prior art utilizes composites that are formed by employing a multitude of layers including elastomeric spunbond, elastomeric fibers including natural and synthetic fibers, and films. Certain combinations of such fabrics are typically laminated, glued together requiring a more costly manufacturing process.

The prior art utilizes hydroentanglement to entangle fibers into an elastomeric spunbond and some of these fibers may be thermobond fibers or hydroentangle elastomeric fibers together to form a composite material.

SUMMARY OF THE INVENTION

The present invention provides for a resilient elastomeric comprised of soft foam, either open or closed cell, as a composite member to provide strength to the total composite. Disclosed is an elastomeric composite structure utilizing at least one cellular structure material as a composite member such that the individual walls of each cell in such structure could behave like an individual fiber and could thus be entangled using otherwise conventional methods of entanglement.

It is the object of the present invention to provide a superior elastomeric nonwoven fabric and to provide a method of production of same that incorporates foam to be used as both a strength and resilient member in the composite fabric. The disclosed invention provides for superior fabric by utilizing hydroentanglement and at least one layer of suitable cellular material, preferably a foam, a backing wire utilizing either flat wire, medium knuckle wire or high knuckle wire, and at least one layer of wood pulp tissue fabric to be entangled utilizing a hydroentanglement process.

The present invention is a nonwoven, relatively strong web, utilizing at least one layer of elastic foam as a constitute composite member. The present disclosure describes a resulting fabric and a method of producing the fabric resulting in a fabric produced by a hydroentanglement process that provides superior characteristics as compared to similar processes utilizing composite fabrics utilizing fibrous materials as conventionally provided.

DETAILED DESCRIPTION OF THE PREFERRED EMBODIMENT

The Prior Art has failed to identify a composite fabric, or a method of making a composite fabric which would yield the best qualities that an elastic member, along with the properties of a fibrous material as a second member of the composite. Foam materials are generally a cellular structure. Each wall of a cell can be made to behave like an individual fiber and accordingly can be entangled with other fibers. Foam cells would continue to contain their windows in that the film between the cell walls remain intact even if a foam cell has been penetrated by a fiber material as a result of some process. Naturally, and in accordance with the invention, a given foam material could be optimized for the appropriate entanglement parameters depending on the foams density, thickness, softness (spring rate) and pore size. Foam products developed to practice the present invention could be tailored for an optimum hydrophobicity or hydrophilicity. By utilizing foam with various stretch qualities and stretch recovery qualities, a final product with the desired properties can easily be obtained in accordance with the present invention. This cellular structure of most foams are aligned such that an entangled fiber is so entangled, in a tortuous path, because of the depth of the many cells breached, by the insertion of fibers through an entanglement process.

Figure 1:
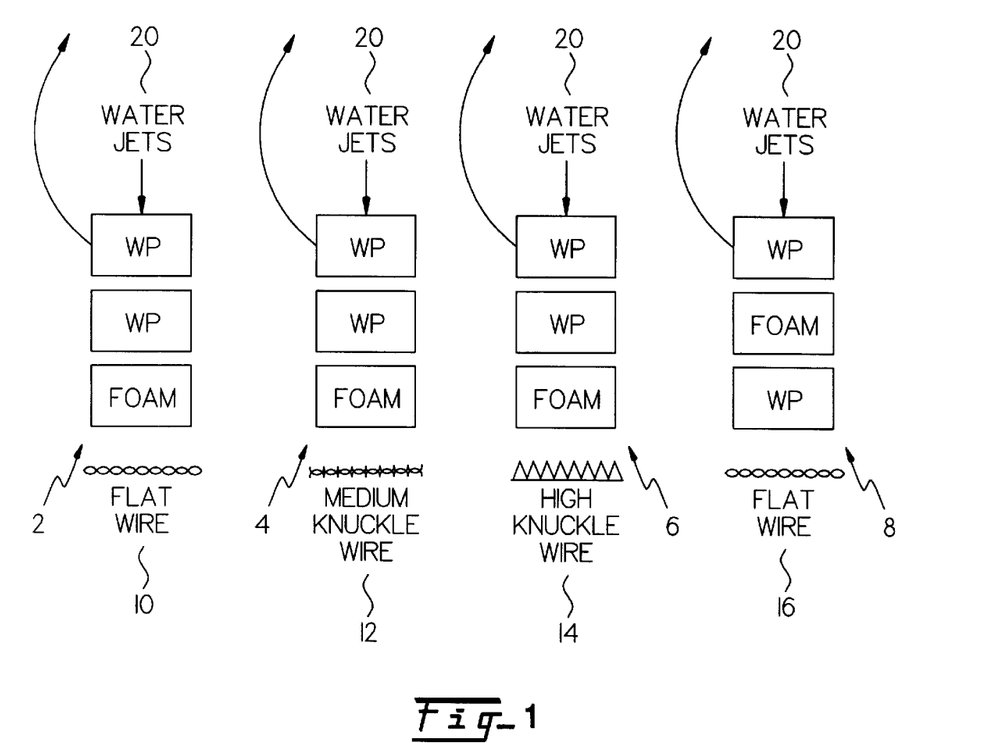
FIG. 1 is an illustration showing the layering position of composite layers of the constitute elements comprising the fabric in relation to the backing or forming wires.

Turning to FIG. 1, a pictorial representation of the layering format necessary to practice the present invention illustrated by several examples. Two wood pulp fiber layers are shown on top of a foam layer utilizing either open or closed cell foam. In the diagrams, two layers or wood pulp tissue of 20 grams/m$^2$ were combined, although a single layer of 40 grams/m$^2$ provides the same or similar end products. In example 2, flat wire 10 is utilized as a backing in the hydroentanglement process to provide a bearing surface for water jets 20 to work three separate constitute layers of the material. In example 4, the same two layers of wood pulp fabric are utilized against a third layer of a suitable foam utilizing a medium knuckle wire 12 as a bearing surface against which water jets 20 work the material for hydroentanglement. Good results have also been obtained by utilizing the same layering of material as shown in example 6 utilizing high knuckle wire 14 to provide courser texturing of the final product. It is also possible to layer wood pulp fabric on either side of the center layer of suitable foam material as shown in example 8 against flat wire 16 to produce a useful composite.

Figure 2:
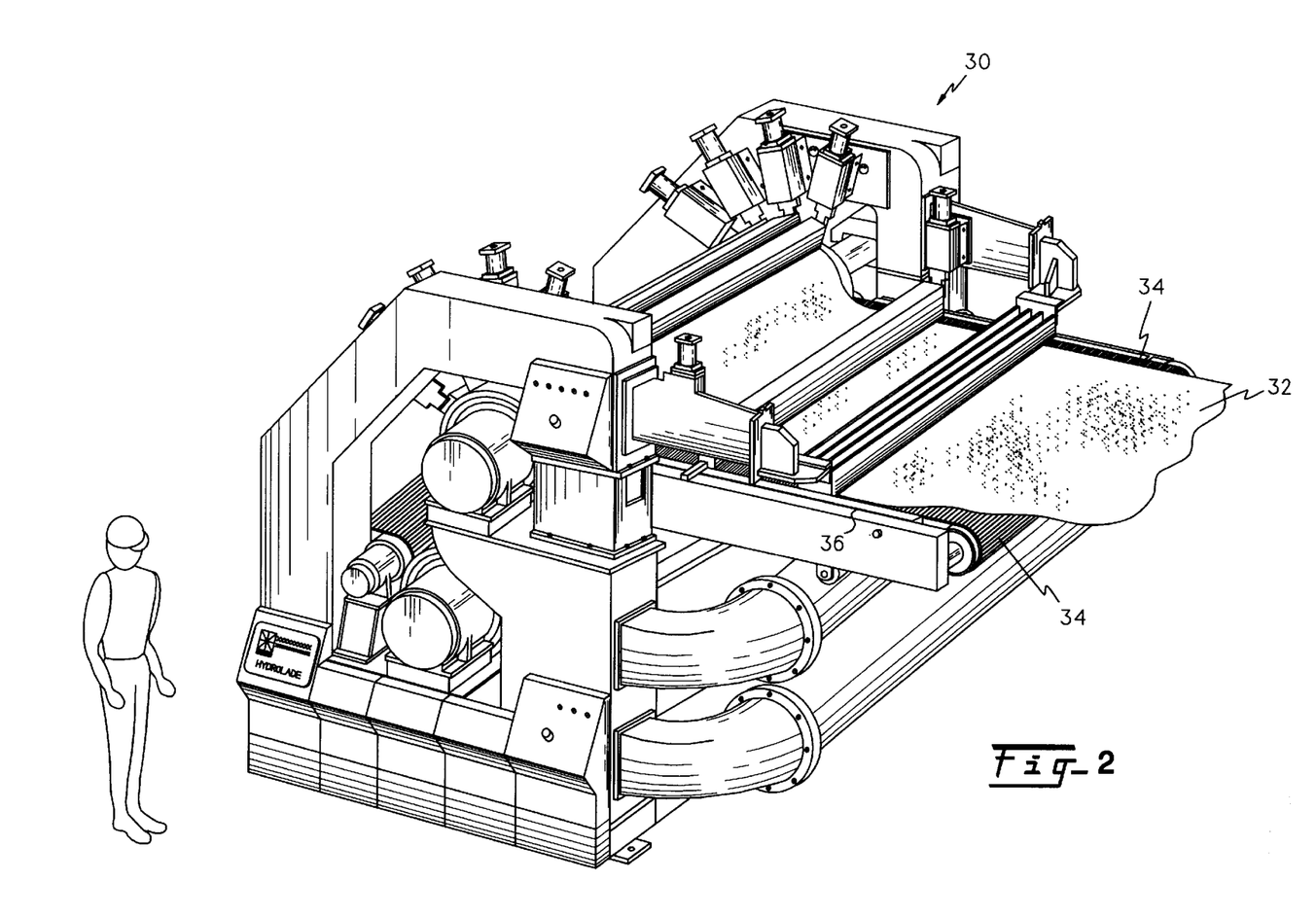
FIG. 2 is a pictorial diagram of an existing hydroentanglement processing machinery.

FIG. 2 illustrates conventional and well-known hydroentanglement processing systems which work fibrous layers of nonwoven materials into a single element exiting processor 30 at 32. Backing wire 34 is shown over the bearing surface 36. The use of the hydroentanglement process currently utilized to hydroentangle fibrous layers of fabric and material can be directly applied to the present invention to hydroentangle fibrous materials and layers into a cellular structured material as in a foam. Little or no change is necessary to the available equipment to produce the end product.

Figure 3:
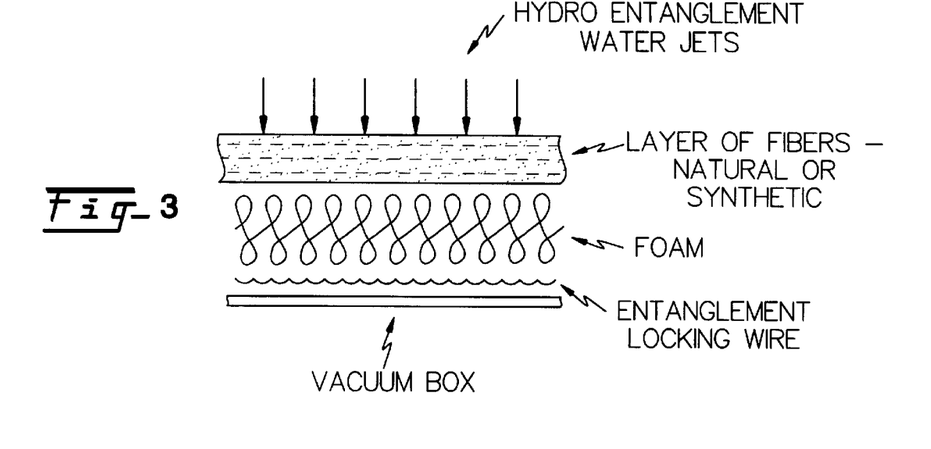
FIG. 3 is a schematic view of a proposed process illustrating the layers of material in the application process.
Figure 4:
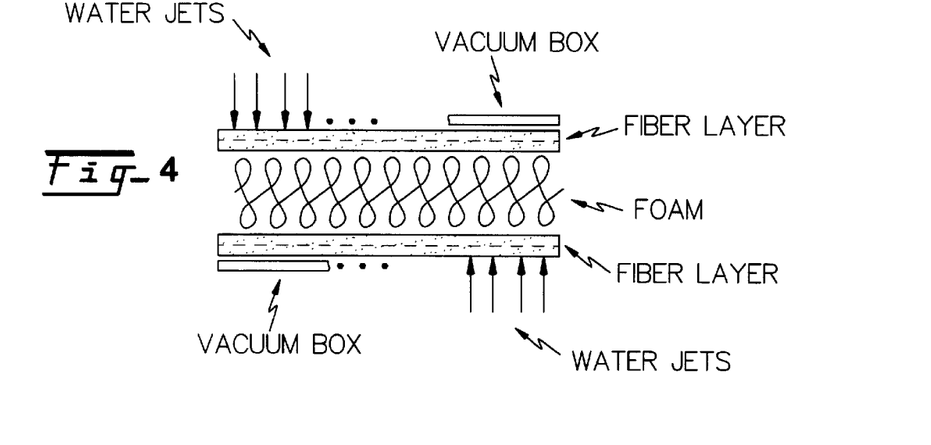
FIG. 4 is a schematic view of the process illustrating a two-sided entanglement.
Figure 5:
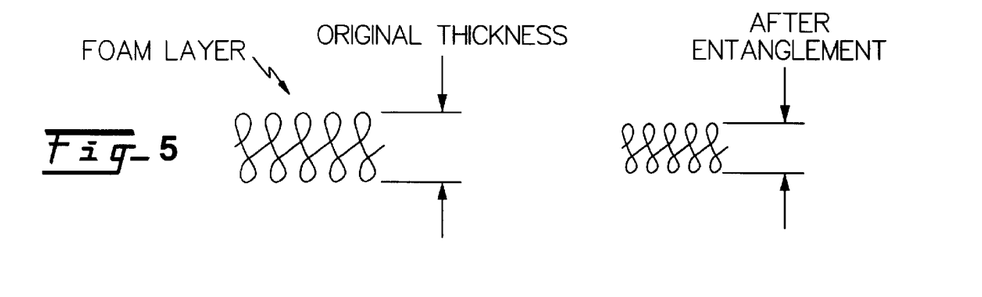
FIG. 5 is a schematic view of the resulting fabric illustrating the thickness of the resulting product.

Considering FIG. 3 there is shown a simple schematic of the process illustrating a layer of fibrous natural or synthetic material as the first layer, a cellular structured material such as a foam as the second layer, and an entanglement backing wire as offered in FIG. 1. Using conventional hydroentanglement processing machinery as illustrated in FIG. 2, a vacuum box is utilized beneath the entanglement wire for the purpose of enhancing the working of the material the side of the fabric opposite of the hydroentanglement water jets shown in FIG. 3. It is also possible to utilize two-sided entanglements as shown in FIG. 4. The hydroentangled composite fabric resulting from the process depicted in FIG. 3 is reversed after the first processing, it is possible to hydroentangle a second layer of fibrous material such as wood pulp or other fibrous layers by utilizing the identical process of entanglement thus producing a two-sided layer.

The use of a cellular composite layer for the entanglement process, the final thickness of the material is reduced, owing partially to the cellular structure being more concentrated and more microporous allowing for finer filtration of particles if the resulting product is used in a filter process. In the "z" dimension the spring rate of the fabric is increased and exhibits more stored bounce back.

It is believed by the inventor that by the utilization of open or closed cell foams in the hydroentanglement process, the embedded fibers from the fibrous layers are locked into the cell structure and are less easily dislodged due to a tortious path through the "z" direction, and the cell pour size reduction. Modification of the backing wire as shown in FIG. 1 assist in producing different textures or patterns as might be desirable in different applications.

The process of making an improved nonwoven fabric includes applying a hydroentanglement process and the application of water jet technology to at least one layer of fibrous material such as wood pulp, and a second layer of a cellular structured material such foam, against a third layer of a backing wire, compressing the constitute elements just described into a singular, non-woven fabric product.

Details of the examples of preferred embodiment regarding the densities and the type of materials which appear to provide a superior product are contained in the following examples, which includes certain illustrations of parameters used and obtained in practicing the invention. Included are specific examples of combinations which fail to produce a fabric in accordance with the invention.

EXAMPLE 1

SAMPLE ID#A-12/20/96
DESCRIPTION:

One piece of woodpulp tissue was placed on top of foam and this woodpulp tissue was entangled into the foam via hydroentanglement. The foam was "flipped over" and the other piece of woodpulp tissue was placed on the back side of the foam and entangled into the foam via hydroentanglement. The resulting structure contained woodpulp fibers on both sides of the foam.

MATERIALS:
A. Woodpulp—Northern softwood pulp tissue—20 grams/sq. Meter per sheet.
B. Foam—Foamex VPF@—1.1 lbs/cubic foot density manufactured in Toupolo, Miss.,
   non-reticulated (contains cell walls),
   fine pore (approx. 100 PPI (Pores per linear inch)),
   ILD (Indention Load Deflection)=6–7,
   initial thickness=0.125 inches thick,
   basis weight=55.9 grams/sq. Meter.

PROCESS:
A. Laboratory hydroentanglement system approx. 20 inches wide.
B. Entanglement backing wire=100×100 mesh stainless steel.
C. Entanglement jet strips=60 nozzles/inch; double rows: each nozzle having a diameter of 0.004 inches.
D. Machine line speed held constant at 50 feet/minute.
E. Vacuum level under jet strip approximately 25 inches to 45 inches of water column.
F. Number of passes under a jet strip/jet strip pressure/total entanglement energy.
   400, 600, 600, 600 PSI
      Flip composite over
   400, 600, 600, 600 PSI
      Total energy=0.211 HP-HR/LBM

EXAMPLE 2

SAMPLE ID# B-12/20/96
DESCRIPTION:

Two pieces of woodpulp tissue were placed on top of foam and this woodpulp tissue was entangled into the foam via hydroentanglement. Samples B, C, and D-12/20/96 define an energy curve for putting various amounts of hydroentanglement energy into the same construction. The resulting structure contained woodpulp fibers on only one side of the foam with a defined level of penetration into the foam.

MATERIALS:
A. Woodpulp—Northern softwood pulp tissue—20 grams/sq. Meter per sheet.
B. Foam—Foamex VPF@—1.2 lbs/cubic foot density manufactured in Toupolo, Miss.,
   non-reticulated (contains cell walls),
   fine pore (approx. 100 PPI (pores per linear inch)),
   ILD (Indention Load Deflection)=6–7,
   initial thickness=0.1875 inches thick,
   basis weight=91.5 grams/sq. Meter PROCESS:
A. Laboratory hydroentanglement system approx. 20 inches wide.
B. Entanglement backing wire=100×100 mesh stainless steel.
C. Entanglement jet strips=60 nozzles/inch; double rows: each nozzle having a diameter of 0.004 inches.
D. Machine line speed held constant at 50 feet/minute.
E. Vacuum level under jet strip approximately 25 inches to 45 inches of water column.
F. Number of passes under a jet strip/jet strip pressure/total entanglement energy.
   400, 500, 600, 600, 600 PSI
      Total energy=0.093 HP-HR/LBM

EXAMPLE 3

SAMPLE ID# B-12/20/96**
DESCRIPTION:

Two pieces of woodpulp tissue were placed on top of foam and this woodpulp tissue was entangled into the foam via hydroentanglement. Samples B, C, and D-12/20/96 define an energy curve for putting various amounts of hydroentanglement energy into the same construction. The resulting structure contained woodpulp fibers on only one side of the foam with a defined level of penetration into the foam.

MATERIALS:
A. Woodpulp—Northern softwood pulp tissue—20 grams/sq. Meter per sheet.

B. Foam—Foamex VPF@—0.7 lbs/cubic foot density
manufactured in Toupolo, Miss.,
non-reticulated (contains cell walls),
fine pore (approx. 100 PPI (pores per linear inch)),
ILD (Indention Load Deflection)=6–7,
initial thickness=0.125 inches thick,
basis weight=35.6 grams/sq. Meter

PROCESS:

A. Laboratory hydroentanglement system approx. 20 inches wide.
B. Entanglement backing wire=100×100 mesh stainless steel.
C. Entanglement jet strips=60 nozzles/inch; double rows: each nozzle having a diameter of 0.004 inches.
D. Machine line speed held constant at 50 feet/minute.
E. Vacuum level under jet strip approximately 25 inches to 45 inches of water column.
F. Number of passes under a jet strip/jet strip pressure/ total entanglement energy.
 400, 500, 600, 600, 600 PSI
  Total energy=0.163 HP-HR/LBM

EXAMPLE 4

SAMPLE ID# C-12/20/96
DESCRIPTION:

Two pieces of woodpulp tissue were placed on top of foam and this woodpulp tissue was entangled into the foam via hydroentanglement. Samples B, C, and D-12/20/96 define an energy curve for putting various amounts of hydroentanglement energy into the same construction. The resulting structure contained woodpulp fibers on only one side of the foam with a defined level of penetration into the foam.

MATERIALS:

A. Woodpulp—Northern softwood pulp tissue—20 grams/sq. Meter per sheet.
B. Foam—Foamex VPF@—1.2 lbs/cubic foot density
manufactured in Toupolo, Miss.,
non-reticulated (contains cell walls),
fine pore (approx. 100 PPI (pores per linear inch)),
ILD (Indention Load Deflection)=6–7,
initial thickness=0.1875 inches thick,
basis weight=91.5 grams/sq. Meter

PROCESS:

A. Laboratory hydroentanglement system approx. 20 inches wide.
B. Entanglement backing wire=100×100 mesh stainless steel.
C. Entanglement jet strips=60 nozzles/inch; double rows: each nozzle having a diameter of 0.004 inches.
D. Machine line speed held constant at 50 feet/minute.
E. Vacuum level under jet strip approximately 25 inches to 45 inches of water column.
F. Number of passes under a jet strip/jet strip pressure/ total entanglement energy.
 400, 600, 800, 1,000, 1,000, 1,000, 1,000, 1,000 PSI
  Total energy=0.301 HP-HR/LBM

EXAMPLE 5

SAMPLE ID# C-12/20/96**
DESCRIPTION:

Two pieces of woodpulp tissue were placed on top of foam and this woodpulp tissue was entangled into the foam via hydroentanglement. Samples B, C, and D-12/20/96 define an energy curve for putting various amounts of hydroentanglement energy into the same construction. The resulting structure contained woodpulp fibers on only one side of the foam with a defined level of penetration into the foam.

MATERIALS:

A. Woodpulp—Northern softwood pulp tissue—20 grams/sq. Meter per sheet.
B. Foam—Foamex VPF@—0.7 lbs/cubic foot density
manufactured in Toupolo, Miss.,
non-reticulated (contains cell walls),
fine pore (approx. 100 PPI (pores per linear inch)),
ILD (Indention Load Deflection)=4–6,
initial thickness=0.125 inches thick,
basis weight=35.6 grams/sq. Meter

PROCESS:

A. Laboratory hydroentanglement system approx. 20 inches wide.
B. Entanglement backing wire=100×100 mesh stainless steel.
C. Entanglement jet strips=60 nozzles/inch; double rows: each nozzle having a diameter of 0.004 inches.
D. Machine line speed held constant at 50 feet/minute.
E. Vacuum level under jet strip approximately 25 inches to 45 inches of water column.
F. Number of passes under a jet strip/jet strip pressure/ total entanglement energy.
 400, 600, 800, 1,000, 1,000, 1,000, 1,000, 1,000 PSI
  Total energy=0.523 HP-HR/LBM

EXAMPLE 6

SAMPLE ID# D-12/20/96
DESCRIPTION:

Two pieces of woodpulp tissue were placed on top of foam and this woodpulp tissue was entangled into the foam via hydroentanglement. Samples B, C, and D-12/20/96 define an energy curve for putting various amounts of hydroentanglement energy into the same construction. The resulting structure contained woodpulp fibers on only one side of the foam with a defined level of penetration into the foam.

MATERIALS:

A. Woodpulp—Northern softwood pulp tissue—20 grams/sq. Meter per sheet.
B. Foam—Foamex VPF@—1.2 lbs/cubic foot density
manufactured in Toupolo, Miss.,
non-reticulated (contains cell walls),
fine pore (approx. 100 PPI (pores per linear inch)),
ILD (Indention Load Deflection)=6–7,
initial thickness=0.1875 inches thick,
basis weight=91.5 grams/sq. Meter

PROCESS:

A. Laboratory hydroentanglement system approx. 20 inches wide.
B. Entanglement backing wire=100×100 mesh stainless steel.
C. Entanglement jet strips=60 nozzles/inch; double rows: each nozzle having a diameter of 0.004 inches.
D. Machine line speed held constant at 50 feet/minute.
E. Vacuum level under jet strip approximately 25 inches to 45 inches of water column.
F. Number of passes under a jet strip/jet strip pressure/ total entanglement energy.

700, 1,200, 1,200, 1,200, 1,200, 1,200, 1,200, 1,200 PSI

Total energy=0.457 HP-HR/LBM

EXAMPLE 7

SAMPLE ID# D-12/20/96**

DESCRIPTION:

Two pieces of woodpulp tissue were placed on top of foam and this woodpulp tissue was entangled into the foam via hydroentanglement. Samples B, C, and D-12/20/96 define an energy curve for putting various amounts of hydroentanglement energy into the same construction. The resulting structure contained woodpulp fibers on only one side of the foam with a defined level of penetration into the foam.

MATERIALS:
  A. Woodpulp—Northern softwood pulp tissue—20 grams/sq. Meter per sheet.
  B. Foam—Foamex VPF@—0.7 lbs/cubic foot density manufactured in Toupolo, Miss.,
    non-reticulated (contains cell walls),
    fine pore (approx. 100 PPI (pores per linear inch)),
    ILD (Indention Load Deflection)=4–6,
    initial thickness=0.125 inches thick,
    basis weight=35.6 grams/sq. Meter PROCESS:
  A. Laboratory hydroentanglement system approx. 20 inches wide.
  B. Entanglement backing wire=100×100 mesh stainless steel.
  C. Entanglement jet strips=60 nozzles/inch; double rows: each nozzle having a diameter of 0.004 inches.
  D. Machine line speed held constant at 50 feet/minute.
  E. Vacuum level under jet strip approximately 25 inches to 45 inches of water column.
  F. Number of passes under a jet strip/jet strip pressure/total entanglement energy.
    700, 1,200, 1,200, 1,200, 1,200, 1,200, 1,200, 1,200 PSI
    Total energy=0.795 HP-HR/LBM

EXAMPLE 8

SAMPLE ID# E-12/20/96

DESCRIPTION:

A layer of carded cotton batting was placed on top of foam and this carded cotton was entangled into the foam via hydroentanglement. The resulting structure contained cotton fibers on only one side of the foam with a defined level of penetration into the foam.

MATERIALS:
  A. Carded cotton batting—fiber length approximately 1.0 inches; 15 grams/sq. Meter.
  B. Foam—Foamex VPF@—1.1 lbs/cubic foot density manufactured in Toupolo, Miss.,
    non-reticulated (contains cell walls),
    fine pore (approx. 100 PPI (pores per linear inch)),
    ILD (Indention Load Deflection)=6–7,
    initial thickness=0.125 inches thick,
    basis weight=55.9 grams/sq. Meter PROCESS:
  A. Laboratory hydroentanglement system approx. 20 inches wide.
  B. Entanglement backing wire=100×100 mesh stainless steel.
  C. Entanglement jet strips=60 nozzles/inch; double rows: each nozzle having a diameter of 0.004 inches.
  D. Machine line speed held constant at 50 feet/minute.
  E. Vacuum level under jet strip approximately 25 inches to 45 inches of water column.
  F. Number of passes under a jet strip/jet strip pressure/total entanglement energy.
    1,000, 1,000, 1,000, 1,000, 1,000, 1,000, 1,000, 1,000 PSI
    Total energy=0.693 HP-HR/LBM

EXAMPLE 9

SAMPLE ID# F-12/20/96

DESCRIPTION:

A layer of carded polyester batting was placed on top of foam and this polyester was entangled into the foam via hydroentanglement. The resulting structure contained polyester fibers on only one side of the foam with a defined level of penetration into the foam.

MATERIALS:
  A. Carded polyester batting—fiber length approximately 1.50 inches;
    Denier=1.5 dpf (denier per filament);
    15 grams/sq. Meter.
  B. Foam—Foamex VPF@—0.7 lbs/cubic foot density manufactured in Orange, Calif.,
    non-reticulated (contains cell walls),
    fine pore (approx. 100 PPI (pores per linear inch)),
    ILD (Indention Load Deflection)=4–6,
    initial thickness=0.125 inches thick,
    basis weight=35.6 grams/sq. Meter PROCESS:
  A. Laboratory hydroentanglement system approx. 20 inches wide.
  B. Entanglement backing wire=100×100 mesh stainless steel.
  C. Entanglement jet strips=60 nozzles/inch; double rows: each nozzle having a diameter of 0.004 inches.
  D. Machine line speed held constant at 50 feet/minute.
  E. Vacuum level under jet strip approximately 25 inches to 45 inches of water column.
  F. Number of passes under a jet strip/jet strip pressure/total entanglement energy.
    1,000, 1,000, 1,000, 1,000, 1,000, 1,000, 1,000, 1,000 PSI
    Total energy=0.971 HP-HR/LBM

EXAMPLE 10

SAMPLE ID# G-12/20/96

DESCRIPTION:

A layer of carded cotton batting was placed on top of foam and this carded cotton was entangled into the foam via hydroentanglement. The resulting structure contained cotton fibers on only one side of the foam with a defined level of penetration into the foam.

MATERIALS:
  A. Carded cotton batting—fiber length approximately 1.0 inches;
    15 grams/sq. Meter.
  B. Foam—Foamex VPF@—0.7 lbs/cubic foot density manufactured in Orange, Calif.,
    non-reticulated (contains cell walls),
    fine pore (approx. 100 PPI (pores per linear inch)), ILD (Indention Load Deflection)=4–6,
initial thickness=0.125 inches thick,
basis weight=35.6 grams/sq. Meter PROCESS:
A. Laboratory hydroentanglement system approx. 20 inches wide.
B. Entanglement backing wire=100×100 mesh stainless steel.
C. Entanglement jet strips=60 nozzles/inch; double rows: each nozzle having a diameter of 0.004 inches.
D. Machine line speed held constant at 50 feet/minute.
E. Vacuum level under jet strip approximately 25 inches to 45 inches of water column.
F. Number of passes under a jet strip/jet strip pressure/ total entanglement energy.
1,000, 1,000, 1,000, 1,000, 1,000, 1,000, 1,000, 1,000 PSI
Total energy=0.971 HP-HR/LBM

EXAMPLE 11

SAMPLE ID# H-12/20/96

DESCRIPTION:

Two layers of woodpulp tissue are placed on top of a lightweight spunbond polypropylene material. This layered assembly is then placed on top of the foam and the whole composite is subjected to entanglement, from top side hydroentanglement only. The resulting structure is very secure and integrated with the woodpulp "anchoring" the spunbond to the foam, thus giving the composite more strength and less elongation.

MATERIALS:
A. Woodpulp—Northern softwood pulp tissue—20 grams/sq. Meter per sheet.
AA. Spunbond polypropylene co-polymer; Amoco RFX@; 20 grams/sq. Meter per sheet 3–4 dpf (denier per filament),
B. Foam—Foamex VPF@—0.7 lbs/cubic foot density manufactured in Orange, Calif.,
non-reticulated (contains cell walls),
fine pore (approx. 100 PPI (pores per linear inch)),
ILD (Indention Load Deflection)=4–6,
initial thickness=0.125 inches thick,
basis weight=35.6 grams/sq. Meter PROCESS:
A. Laboratory hydroentanglement system approx. 20 inches wide.
B. Entanglement backing wire=100×100 mesh stainless steel.
C. Entanglement jet strips=60 nozzles/inch; double rows: each nozzle having a diameter of 0.004 inches.
D. Machine line speed held constant at 50 feet/minute.
E. Vacuum level under jet strip approximately 25 inches to 45 inches of water column.
F. Number of passes under a jet strip/jet strip pressure/ total entanglement energy.
700, 1,200, 1,200, 1,200, 1,200, 1,200, 1,200, 1,200 PSI
Total energy=0.629 HP-HR/LBM

EXAMPLE 12

SAMPLE ID# J-12/20/96

DESCRIPTION:

Two pieces of woodpulp tissue were placed on top of foam and this woodpulp tissue was entangled into the foam via hydroentanglement. This sample was mounted on a coarse wire (20×20 mesh) and the entanglement was performed on the top side only. The resulting structure contained woodpulp fibers on only one side of the foam with a defined level of penetration into the foam. This structure was also unique in that the sample contained areas of "peaks and valleys" thus creating a three-dimensional topography in the final composite structure.

MATERIALS:
A. Woodpulp—Northern softwood pulp tissue—20 grams/sq. Meter per sheet.
B. Foam—Foamex VPF@—0.7 lbs/cubic foot density manufactured in Orange, Calif.,
non-reticulated (contains cell walls),
fine pore (approx. 100 PPI (pores per linear inch)),
ILD (Indention Load Deflection)=4–6,
initial thickness=0.125 inches thick,
basis weight=35.6 grams/sq. Meter PROCESS:
A. Laboratory hydroentanglement system approx. 20 inches wide.
B. Entanglement backing wire=20×20 mesh synthetic (Polyester/nylon).
C. Entanglement jet strips=60 nozzles/inch; double rows: each nozzle having a diameter of 0.004 inches.
D. Machine line speed held constant at 50 feet/minute.
E. Vacuum level under jet strip approximately 25 inches to 45 inches of water column.
F. Number of passes under a jet strip/jet strip pressure/ total entanglement energy.
1,000, 1,000, 1,000, 1,000, 1,000, 1,000, 1,000, 1,000, 1,000, 1,000 PSI
Total energy=0.788 HP-HR/LBM

EXAMPLE 13

SAMPLE ID#K-12/20/96

DESCRIPTION:

Two pieces of woodpulp tissue were placed on top of foam and this woodpulp tissue was entangled into the foam via hydroentanglement. The entanglement was performed on the top side only. The resulting structure contained woodpulp fibers on only one side of the foam with a defined level of penetration into the foam.

MATERIALS:
A. Woodpulp—Northern softwood pulp tissue—20 grams/square Meter per sheet.
B. Foam—Foamex VPF@—0.6 lbs/cubic foot density (Reflex),
manufactured in Orange, Calif.,
non-reticulated (contains cell walls),
fine pore (approx. 100 PPI (pores per linear inch)),
ILD (Indention Load Deflection)=3–4,
initial thickness—0.0625 inches thick,
basis weight—15.26 grams/square Meter.

PROCESS:
A. Laboratory hydroentanglement system approx. 20 inches wide.
B. Entanglement backing wire=100×100 mesh stainless steel.
C. Entanglement jet strips=60 nozzles/inch; double rows: each nozzle having a diameter of 0.004 inches.
D. Machine line speed held constant at 50 feet/minute.
E. Vacuum level under jet strip approximately 25 inches to 45 inches of water column.

F. Number of passes under a jet strip/jet strip pressure/ total entanglement energy.
1,000, 1,000, 1,000, 1,000, 1,000, 1,000, 1,000, 1,000, PSI
total energy=0.890 HP-HR/LBM

EXAMPLE 14

SAMPLE ID#K1-12/20/96
DESCRIPTION:
One piece of woodpulp tissue was placed on top of foam and this woodpulp tissue was entangled into the foam via hydroentanglement. The foam was "flipped over" and the other piece of woodpulp tissue was placed on the back side of the foam and entangled into the foam via hydroentanglement. The resulting structure contained woodpulp fibers on both sides of the foam.
MATERIALS:
A. Woodpulp—Northern softwood pulp tissue—20 grams/square Meter per sheet.
B. Foam—Foamex VPF@—0.6 lbs/cubic foot density (Reflex),
manufactured in Orange, Calif.,
non-reticulated (contains cell walls),
fire pore (approx. 100 PPI (pores per linear inch)),
ILD (Indention Loan Deflection)=3–4,
initial thickness=0.0625 inches thick,
basis weight=15.26 grams/square Meter.
PROCESS:
A. Laboratory hydroentanglement system approx. 20 inches wide.
B. Entanglement backing wire=100×100 mesh stainless steel.
C. Entanglement jet strips=60 nozzles/inch; double rows: each nozzle having a diameter of 0.004 inches.
D. Machine line speed held constant at 50 feet/minute.
E. Vacuum level under jet strip approximately 25 inches to 45 inches of water column.
F. Number of passes under a jet strip/jet strip pressure/ total entanglement energy.
1,000, 1,000, 1,000, 1,000, PSI, then flip over and add . . . 1,000, 1,000, 1,000, 1,000, PSI
total energy=0.890 HP-HR/LBM

EXAMPLE 15

SAMPLE ID# L-12/20/96
DESCRIPTION:
Three pieces of woodpulp tissue were placed on top of foam and this woodpulp tissue was entangled into the foam via hydroentanglement. The resulting structure contained woodpulp fibers on only one side of the foam with a defined level of penetration into the foam.
MATERIALS:
A. Woodpulp—Northern softwood pulp tissue—20 grams/square Meter per sheet.
B. Foam—Foamex VPF@—0.6 lbs/cubic foot density (Reflex),
manufactured in Orange, Calif.,
non-reticulated (contains cell walls),
fine pore (approx. 100 PPI (pores per linear inch))
ILD (Indention Load Deflection)=3–4,
initial thickness=0.0625 inches thick,
basis weight=15.26 grams/square Meter
PROCESS:
A. Laboratory hydroentanglement system approx. 20 inches wide.
B. Entanglement backing wire=100×100 mesh stainless steel.
C. Entanglement jet strips=60 nozzles/inch; double rows: each nozzle having a diameter of 0.004 inches.
D. Machine line speed held constant at 50 feet/minute.
E. Vacuum level under jet strip approximately 25 inches to 45 inches of water column.
F. Number of passes under a jet strip/jet strip pressure/ total entanglement energy.
1,000, 1,000, 1,000, 1,000, 1,000, 1,000, 1,000, 1,000, PSI
total energy=0.653 HP-HR/LBM

EXAMPLE 16

SAMPLE ID# FAILURE #1 (Pore size too large, too many large holes, entanglement not fully integrated into the "crators" of the foam).
DESCRIPTION:
Two pieces of woodpulp tissue were placed on top of foam and this woodpulp tissue was entangled into the foam via hydroentanglement. The resulting structure contained woodpulp fibers on only one side of the foam was a defined level of penetration into the foam.
MATERIALS:
A. Woodpulp—Northern softwood pulp tissue—20 grams/square Meter per sheet.
B. Foam—Foamex VPF@—0.8 lbs/cubic foot density. manufactured in Orange, Calif.
non-reticulated (contains cell walls).
Mid pore (approx. 40 to 50 PPI (pores per linear inch)).
ILD (Indention Load Deflection)=4–6,
initial thickness=0.250 inches thick.
basis weight=81.37 grams/square Meter.
PROCESS:
A. Laboratory hydroentanglement system approx. 20 inches wide.
B. Entanglement backing wire=100×100 mesh stainless steel.
C. Entanglement jet strips=60 nozzles/inch; double rows: each nozzle having a diameter of 0.004 inches.
D. Machine line speed held constant at 50 feet/minute.
E. Vacuum level under jet strip approximately 25 inches to 45 inches of water column.
F. Number of passes under a jet strip/jet strip pressure/ total entanglement energy.
1,000, 1,000, 1,000, 1,000, 1,000, 1,000, 1,000, 1,000, PSI
total energy=0.405 HP-HR/LBM

EXAMPLE 17

SAMPLE ID# FAILURE #2 (ILD too high—foam too rigid/stiff to allow entanglement—water just bounced-off the composite during entangling attempt).
DESCRIPTION:
Two pieces of woodpulp tissue were placed on top of foam and this woodpulp tissue was entangled into the foam via hydroentanglement. The resulting structure contained woodpulp fibers on only one side of the foam with a defined level of penetration into the foam.
MATERIALS:
A. Woodpulp—Northern softwood pulp tissue—20 grams/square Meter per sheet.

B. Foam—Foamex AquaZone@—3.2 lbs/cubic foot density.
  manufactured in Essington, Pa.
  non-reticulated (contains cell walls).
  super fine pore (greater than 100 PPI (pores per linear inch)).
  ILD (Indention Load Deflection)=10–12,
  initial thickness=0.125 inches thick,
  basis weight=162.7 grams/square Meter.

PROCESS:

A. Laboratory hydroentanglement system approx. 20 inches wide.

B. Entanglement backing wire=100×100 mesh stainless steel.

C. Entanglement jet strips=60 nozzles/inch; double rows: each nozzle having a diameter of 0.004 inches.

D. Machine line speed held constant at 50 feet/minute.

E. Vacuum level under a jet strip approximately 25 inches to 45 inches of water column.

F. Number of passes under a jet strip/jet strip pressure/total entanglement energy.
  1,000, 1,000, 1,000, 1,000, 1,000, 1,000, 1,000, 1,000, PSI
    total energy=0.242 HP-HR/LBM

EXAMPLE 18

SAMPLE ID# 1-12/20/96

DESCRIPTION:

Two pieces of woodpulp tissue were placed on top of foam and this woodpulp tissue was entangled into the foam via hydroentanglement. The resulting structure contained woodpulp fibers on only one side of the foam with a defined level of penetration into the foam.

MATERIALS:

A. Woodpulp—Northern softwood pulp tissue—20 grams/square Meter per sheet.

B. Foam—Foamex VPF@—0.5 lbs/cubic foot density,
  manufactured in Essington, Pa. (only lab samples available),
  non-reticulated (contains cell walls),
  fine pore (approx. 100 PPI (pores per linear inch))
  ILD (Indention Load Deflection)=4,
  initial thickness=0.125 inches thick,
  basis weight=25.43 grams/square Meter

PROCESS:

A. Laboratory hydroentanglement system approx. 20 inches wide.

B. Entanglement backing wire=100×100 mesh stainless steel.

C. Entanglement jet strips=60 nozzles/inch; double rows: each nozzle having a diameter of 0.004 inches.

D. Machine line speed held constant at 50 feet/minute.

E. Vacuum level under jet strip approximately 25 inches to 45 inches of water column.

F. Number of passes under a jet strip/jet strip pressure/total entanglement energy.
  1,000, 1,000, 1,000, 1,000, 1,000, 1,000, 1,000, PSI
    total energy=0.657 HP-HR/LBM

EXAMPLE 19

SAMPLE ID# FAILURE #2 (ILD too high—foam too rigid/stiff to allow entanglement—water just bounced-off the composite during entangling attempt).**

DESCRIPTION:

Two pieces of woodpulp tissue were placed on top of foam and this woodpulp tissue was entangled into the foam via hydroentanglement. The resulting structure contained woodpulp fibers on only one side of the foam with a defined level of penetration into the foam.

MATERIALS:

A. Woodpulp—Northern softwood pulp tissue—20 grams/square Meter per sheet.

B. Foam—Foamex AquaZone@—1.7 lbs/cubic foot density.
  manufactured in Essington, Pa.
  non-reticulated (contains cell walls).
  super fine pore (greater than 100 PPI (pores per linear inch)).
  ILD (Indention Load Deflection)=10–12,
  initial thickness=0.125 inches thick,
  basis weight=86.46 grams/square Meter.

PROCESS:

A. Laboratory hydroentanglement system approx. 20 inches wide.

B. Entanglement backing wire=100×100 mesh stainless steel.

C. Entanglement jet strips=60 nozzles/inch; double rows: each nozzle having a diameter of 0.004 inches.

D. Machine line speed held constant at 50 feet/minute.

E. Vacuum level under a jet strip approximately 25 inches to 45 inches of water column.

F. Number of passes under a jet strip/jet strip pressure/total entanglement energy.
  1,000, 1,000, 1,000, 1,000, 1,000, 1,000, 1,000, 1,000, PSI
    total energy=0.389 HP-HR/LBM The inventor has also determined foams with an indentation force deflection (IFD), previously known as ILD, of between 7.0 and 4.0 provides suitable candidates for use in the process described.

Considering the details specifically, it has been noted by the inventor that there has been cellular structured material, and specifically foam materials which have not functioned well to provide a final product described in this paper. In the past, and in the prior art, foams of greater density such as that available from Woodbridge foam fabricating, their product SM 64, does not function well, since the end product resulting from attempting to utilize the foam in a hydroentanglement process does not tangle adequately to provide a stable final product. The inventor has found that foams such as those marketed by Foamex, their variable pressure foam (VPF), works well as the cellular structure component in the process disclosed. Both natural fibers, such as wood pulp, cotton and rayon or synthetic fibers of the polypropylene, polyester, polyethylene family works well. The inventor has observed that foam densities of around or about 1.7 pounds per foot$^3$ down to and including a density of approximately 0.5 pounds per cubic foot provide a considerable improvement in the successful entanglement of fiber layers into foam. Although it does not matter whether the foam used for entanglement is of an open or a closed cell structure, foam densities appear to make a critical difference in hydroentanglement fibrous materials, whether natural fibers or synthetic fibers.

The cell structure of the foam is believed to provide a fiber locking mechanism to maintain the entanglement, without the use of thermo-meltable fabrics or by component fibers also known as sheath/core fibers or binder fibers utilized in the prior art. It is not necessary, in the disclosed invention, to utilize adhesives or short fibers to maintain the entanglement.

The resulting product is superior in various qualities including very low linting, superior elastomeric properties, and leaves very little debris in the dewatering or drying process.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed as being new, useful and desired to be protected by Letters Patent of the United States is as follows:

1. A nonwoven elastomeric web material comprising a hydraulically entangled admixture of:
    (1) a first component of elastomeric foam, to be used as the base of the structure and
    (2) a second component of individual natural and/or synthetic fibers, said admixture having been subjected to pressurized liquid water jets causing entanglement and intertwining of said first component and second component so as to form as integrated elastomeric web material.

2. The claim as in 1 wherein said first component of elastomeric foam is at least 20% of the total weight of the two components prior to entanglement.

3. A nonwoven elastomeric web material according to claim 2, wherein fibers are deposited and intertwined from only one side of said elastomeric foam.

4. A nonwoven elastomeric web material according to claim 3, wherein said fibers are deposited and intertwined from both sides of the elastomeric foam.

5. A nonwoven elastomeric web material according to claim 3, wherein further the surface texture of the material is uniform.

6. A nonwoven elastomeric web material according to claim 3, wherein the surface texture of the product is nubby in appearance caused by discontinuous densified regions of said foam and fiber integration.

7. A nonwoven elastomeric web material according to claim 3, wherein said second component includes pulp fibers.

8. A nonwoven elastomeric web material according to claim 7, wherein said pulp fibers include cellulosic pulp fibers.

9. A nonwoven elastomeric web material according to claim 8, wherein said second component is selected from the group consisting of wood fibers, rayon fibers, and cotton fibers.

10. A nonwoven elastomeric web material according to claim 1, wherein further said second component includes synthetic fibers.

11. A nonwoven elastomeric web material according to claim 9, wherein said second component is selected from the group consisting of polyester, polyolefins, and nylon families or co-polymer of said group.

12. A nonwoven elastomeric web material according to claim 1, wherein said elastomeric web material has isotropic stretch and recovery, in both machine and cross-directions.

13. A nonwoven elastomeric web material according to claim 1, wherein the admixture includes a reinforcing material to limit stretch.

* * * * *

UNITED STATES PATENT AND TRADEMARK OFFICE
CERTIFICATE OF CORRECTION

PATENT NO : 6,074,966
DATED : 6/13/00
INVENTOR(S): Frank P. Zlatkus

It is certified that error appears in the above-identified patent and that said Letters Patent are hereby corrected as shown below:

On the cover page, at [60],

The related U.S. application data should read: "Provisional application number 60/024,721, September 9, 1996."

Column 1, Line 7,

The reference to prior application should read: "This application claims the benefit of the filing date of the applicant's provisional patent application number 60/024,721 filed September 9, 1996."

Signed and Sealed this

Third Day of April, 2001

*Attest:*

NICHOLAS P. GODICI

*Attesting Officer*     *Acting Director of the United States Patent and Trademark Office*